UNITED STATES PATENT OFFICE.

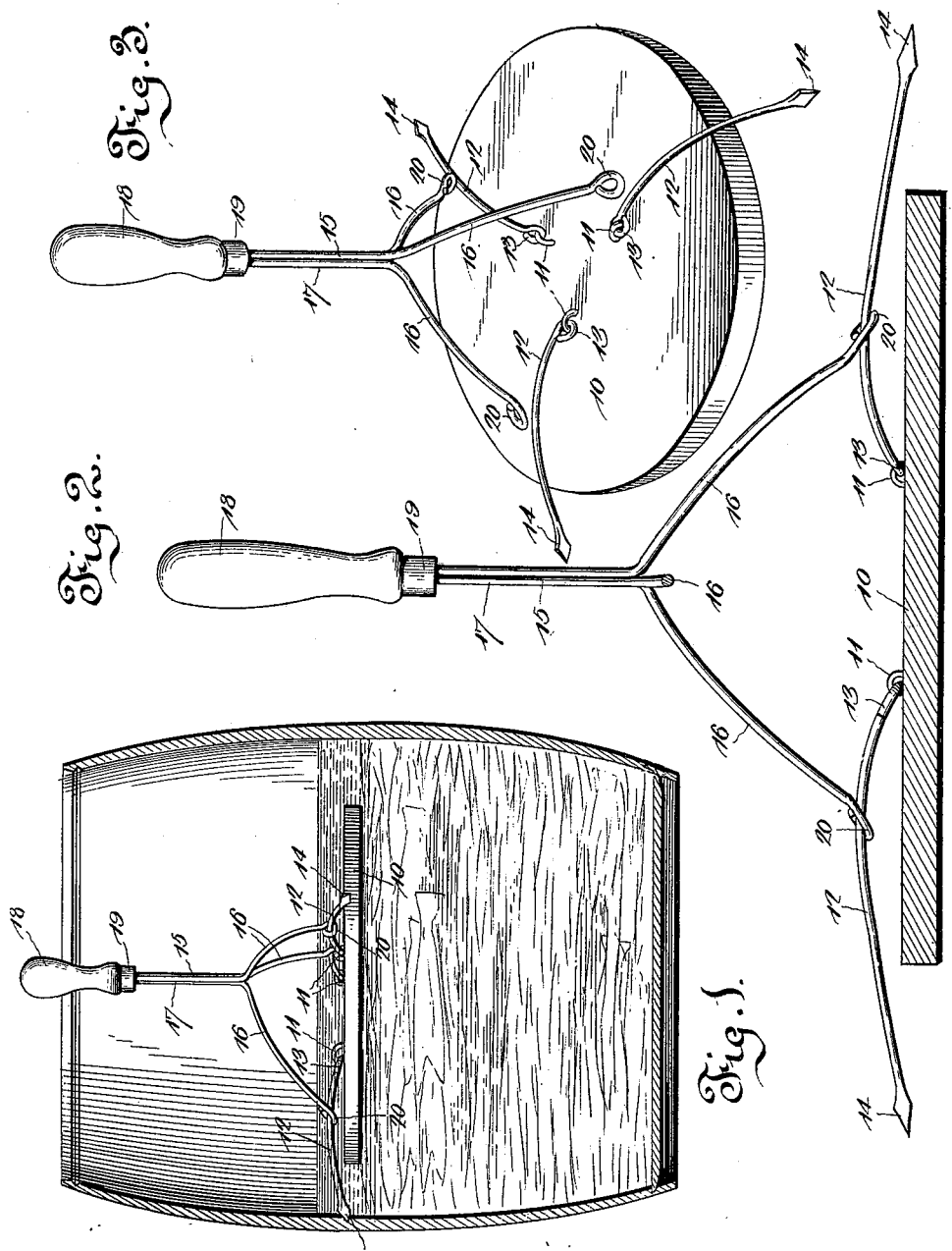

DAVID WILLIS SHANKS, OF SAN ANTONIO, TEXAS, ASSIGNOR TO A. SCHENCK, OF SAME PLACE.

FOLLOWER FOR BARRELS.

SPECIFICATION forming part of Letters Patent No. 631,676, dated August 22, 1899.

Application filed November 21, 1898. Serial No. 697,062. (No model.)

*To all whom it may concern:*

Be it known that I, DAVID WILLIS SHANKS, a citizen of the United States, residing at San Antonio, in the county of Bexar and State of Texas, have invented a new and useful Follower for Barrels, of which the following is a specification.

My invention relates to improvements in followers for barrels, casks, and other receptacles designed to contain meats, pickles, and other food which are to be immersed or submerged in brine or other preservative liquors.

The object of the present invention is to provide an improved construction which may be fastened securely in place to keep the food submerged in the liquid and which may be easily released from the cask previous to withdrawing the follower in order to obtain access to the contents of the barrel.

With these ends in view the invention consists in the novel construction and arrangement of parts, which will be hereinafter fully described and claimed.

To enable others to understand the invention, I have illustrated the preferred embodiment thereof in the accompanying drawings, forming a part of this specification, and in which—

Figure 1 is a sectional elevation of one style of cask or barrel with my improved follower secured therein. Fig. 2 is a vertical sectional elevation with the parts assembled or connected together. Fig. 3 is a perspective view with the follower-head and the adjuster separated one from the other.

Like numerals of reference denote like and corresponding parts in each of the several figures of the drawings.

The follower-head 10 of my invention may be constructed of wood, metal, or any other preferred material, and the diameter of this head is somewhat less than the internal diameter of the cask or barrel in which the follower is to be used.

To the upper side of the follower is secured a series of staples 11, which are arranged, preferably, at equidistant points from each other and from the center of the follower-head, and loosely connected to the series of staples are a like series of holding-dogs 12. Each dog is made of metal, preferably wire, which is galvanized or protected by a suitable coating or film to obviate corrosion of the metal. Each dog is curved longitudinally, as shown by the drawings, and the inner end of said dog is bent to form the eye 13, while the outer extremity of the dog is tapered to a sharp penetrating-point 14. The curved dogs are loosely attached to the follower-head by passing the staples 11 through the eyes 13, and these dogs extend a suitable distance beyond the circumferential edge of the follower-head for the purpose of engaging with the wall or staves of the barrel or cask in which the follower is to be used.

To provide for the simultaneous adjustment of the series of holder-dogs and enable the dogs to be engaged with or disengaged from the barrel or cask without requiring the operator to immerse the hands in the brine or other liquid in which the food is submerged, I employ the adjuster 15. This adjuster has a series of radial arms 16, each of which is integral with a vertical length. The vertical lengths of the arms are assembled in parallel relation and united firmly together by soldering, brazing, or in any other suitable way to provide a stiff rigid shank 17. To the upper end of this shank is firmly secured a handle 18, which is provided with the band or ferrule 19, that serves to prevent splitting of the handle when it is forced tightly on the shank. The radial arms 16 incline downwardly from the stiff shank of the adjuster, and the lower free extremities of said arms have the eyes or loops 20.

The arms 16 are spaced correspondingly to the arrangement of the series of dogs 12, and these dogs are received loosely in the eyes or loops 20 of the arms, whereby the adjuster is slidably coupled to the series of dogs for the purpose of adjusting the latter simultaneously. By connecting the dogs loosely to the follower-head and by curving the dogs longitudinally, as shown, the adjuster may be moved with facility in order to force the pointed extremities of the dogs into the barrel or to retract the dogs from fixed engagement with said barrel.

In using my improved device the follower-head is placed in the cask or other receptacle to rest on the food which is contained in the brine or preservative liquid, and this follower-head is depressed below the liquid-level, so as to be submerged in the liquid and to prevent the contents of the cask from rising to the surface. After the follower has been properly submerged the adjuster is forced downwardly, so as to press the pointed extremities of the holding-dogs into firm engagement with the barrel or cask, and the follower is thus held securely in its adjusted position. To obtain access to the contents of the cask, it is only necessary to lift the adjuster, thereby withdrawing the dogs from engagement with the cask, and the follower may now be removed or be moved to one side of the cask for the operator to take out the meat or other food from the brine.

It will be observed that the adjuster of my invention is entirely disconnected from the follower-head and that the arms of such adjuster are loosely connected to the holding-dogs which the adjuster is designed to control.

The adjuster is simple in construction and embraces a stiff rigid shank adapted to resist and withstand the pressure which is exerted by the operator on the device in order to force the dogs into engagement with the cask or to withdraw them from such engagement.

The improved follower is simple and durable in construction, efficient in operation, and cheap of manufacture. The parts thereof may be readily disconnected when it is desired to cleanse the head 10.

Changes may be made in the form of some of the parts while their essential features are retained and the spirit of the invention embodied. Hence I do not desire to be limited to the precise form of all the parts as shown, reserving the right to vary therefrom.

Having thus described the invention, what I claim is—

In a barrel-follower, an adjuster consisting of a series of members, each having an inclined length provided at its free end with a loop and a vertical length arranged parallel to, and united firmly with the corresponding lengths of the other members and forming a stiff vertical shank, and a handle secured to said shank, in combination with a follower-head, and the series of bowed dogs pivoted to the follower-head and having the pointed free ends, said adjuster having the loops of its members fitted slidably to the dogs to be detached at will therefrom and adapted to serve as a means for depressing the head and for adjusting the dogs, substantially as described.

In testimony that I claim the foregoing as my own I have hereto affixed my signature in the presence of two witnesses.

DAVID WILLIS SHANKS.

Witnesses:
J. HOUSTON LEECH,
R. H. GILLOOK.